US009171006B2

(12) United States Patent
Kvm et al.

(10) Patent No.: US 9,171,006 B2
(45) Date of Patent: Oct. 27, 2015

(54) MOBILE STATION WITH EXPANDED STORAGE SPACE AND METHOD OF RETRIEVING FILES BY THE MOBILE STATION

(75) Inventors: Naidu Kvm, Bangalore (IN); Rajeev Rastogi, Bangalore (IN); Jeyashankher Sr, Bangalore (IN); Anand Srinivasan, Karnataka (IN)

(73) Assignee: Alcatel Lucent, Boulogne-Billancourt (FR)

( * ) Notice: Subject to any disclaimer, the term of this patent is extended or adjusted under 35 U.S.C. 154(b) by 707 days.

(21) Appl. No.: 11/783,137

(22) Filed: Apr. 6, 2007

(65) Prior Publication Data

US 2008/0250024 A1 Oct. 9, 2008

(51) Int. Cl.
*G06F 17/30* (2006.01)

(52) U.S. Cl.
CPC ................................ *G06F 17/30132* (2013.01)

(58) Field of Classification Search
CPC ................................................. G06F 17/30132
USPC ............ 707/1, 705, 736, 758, 770, 609, 610, 707/812; 711/213
See application file for complete search history.

(56) References Cited

U.S. PATENT DOCUMENTS

| | | | | |
|---|---|---|---|---|
| 6,715,126 | B1 * | 3/2004 | Chang et al. | 715/201 |
| 6,834,306 | B1 * | 12/2004 | Tsimelzon | 709/228 |
| 2008/0065583 | A1 * | 3/2008 | Coverston et al. | 707/1 |
| 2008/0147671 | A1 * | 6/2008 | Simon et al. | 707/10 |

OTHER PUBLICATIONS

Wang et al., "A Data Access Method in Mobile Computing Environment: Using Data Prefetch Technology in Parallel Control System Architecture", Machine Learning and Cybernetics, 2006 International Conference on (1-4244-0061-9) Aug. 13-16, 2006. pp. 410-419. Download: http://ieeexplore.ieee.org/stamp/stamp.jsp?arnumber=04028851.*

Yin et al., "A generalized target-driven cache replacement policy for mobile environments", Applications and the Internet, 2003. Proceedings. 2003 Symposium on Publication Date: Jan. 27-31, 2003, pp. 14-21. Download: http://ieeexplore.ieee.org/stamp/stamp.jsp?tp=&arnumber=1183028&isnumber=26546.*

* cited by examiner

*Primary Examiner* — Hares Jami
(74) *Attorney, Agent, or Firm* — Harness, Dickey & Pierce, P.L.C.

(57) ABSTRACT

Disclosed is a mobile station having an expanded storage space, and a method of retrieving a file stored in a remote storage server. The method may include determining whether the file is locally stored or remotely stored, deleting files in a local storage to provide space if the file is determined to reside in a remote storage server, downloading the file from a remote storage server over the Internet by prefetching a portion of the file from the remote storage server, and opening the prefetched portion of the file while concurrently downloading a remaining portion of the file from the remote storage server.

20 Claims, 3 Drawing Sheets

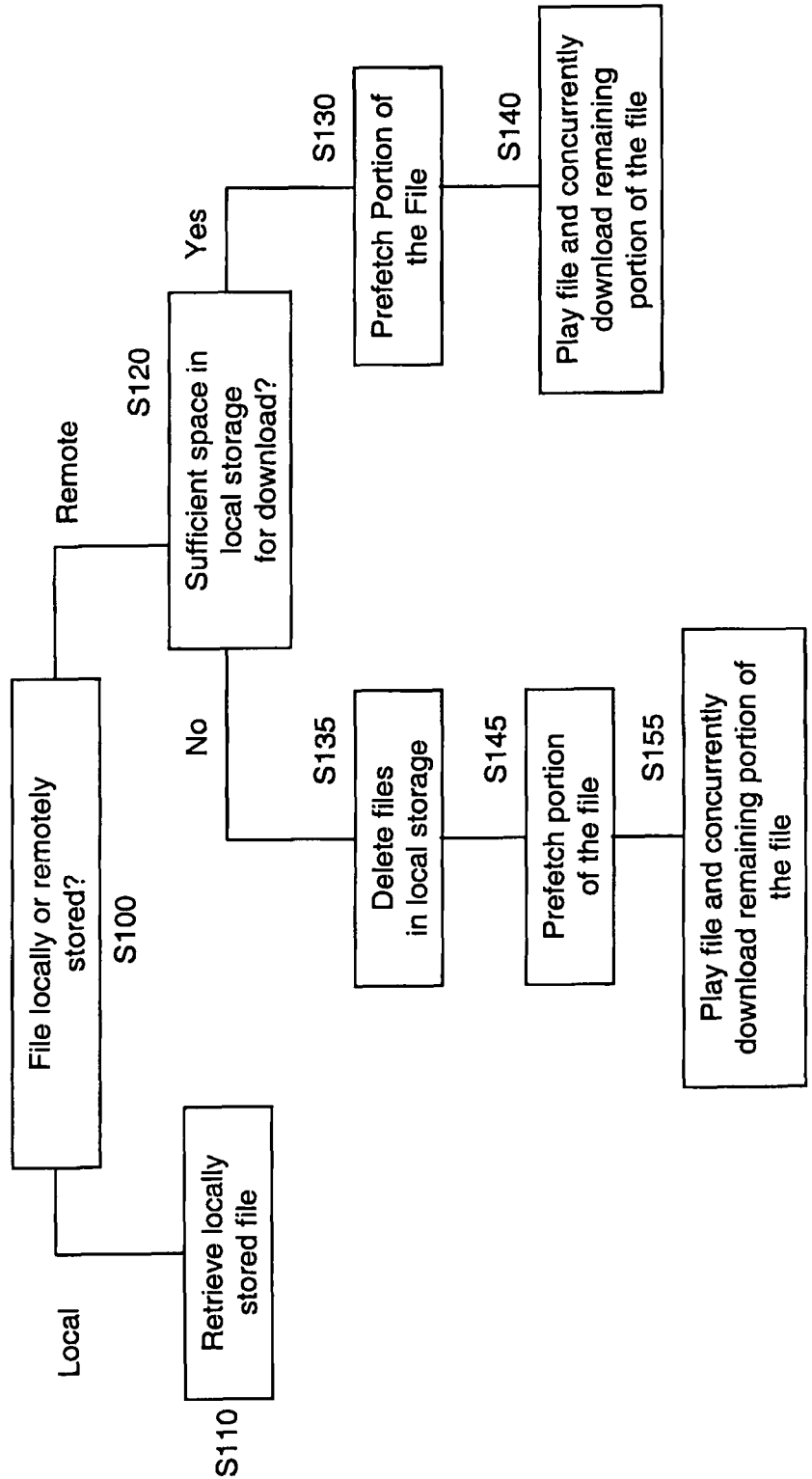

MOBILE STATION WITH EXPANDED STORAGE SPACE AND METHOD OF RETRIEVING FILES BY THE MOBILE STATION

BACKGROUND OF THE INVENTION

Many end-users want access to multimedia files including music, videos, games, photographs, etc., even while they are away from their personal computers or laptops. A convenient method for an end-user to access their multimedia files is to store their multimedia files on their cell phone. Therefore, storage requirements for cell phones are expected to grow significantly in the coming years. However, providing large storage space on a cell phone is problematic due to the size and expense of very small storage devices (e.g., media cards and small internal hard disks).

A conventional method for an end-user to store a large amount of data and access the data is through a web-enabled cell phone. The end-user may access the Internet and utilize online web-based storage repositories (websites) to store the multimedia files. These storage websites allow an end-user to store data on the website and also allow the end-user to access the data from mostly anywhere on the web-enabled cell phone. In particular, an end-user may log-on to the website from a web-enabled cell phone, and then gain access to all the files that the end-user has uploaded onto that website.

However, most storage websites are designed to be accessed by desktop and laptop computers. Accordingly, security measures, access protocols, uploading and downloading files are designed for use by computers. Specifically, the websites usually require the HTTP protocol that runs over TCP, which is known to perform poorly in high error rate wireless environments. Furthermore, HTTP is a wireless connection agnostic, which is designed for wireline link connections that are reliable and stable. In contrast, wireless link quality can vary considerably depending on user location and/or the number of other users sharing the wireless connection.

Another limitation for a cell phone is that it must have the storage capacity to download and play a large media file. Manual deletion of local files on the cell phone may be required prior to download, which may be time consuming and inconvenient.

SUMMARY OF THE INVENTION

In an example embodiment of the present invention, a method of retrieving a file includes determining whether the file is locally stored or remotely stored, deleting files in a local storage to provide space if the file is determined to reside in a remote storage server and insufficient space exists in the local storage for the file, downloading the file from a remote storage server by prefetching a portion of the file from the remote storage server, and opening the prefetched portion of the file while concurrently downloading a remaining portion of the file from the remote storage server.

In another example embodiment of the present invention, a mobile station adapted to access files in a remote storage server includes a file downloader/uploader (FDU) configured to communicate with a remote storage server, and a driver configured to determine whether a file is locally stored or remotely stored, to delete files in a local storage to provide space if the file is remotely stored and insufficient space exists in the local storage for the file, and the driver further configured to prefetch a portion of the file from the remote storage server, and to open the prefetched portion of the file while concurrently downloading a remaining portion of the file from the remote storage server via the FDU.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

FIG. 3 is a flow diagram of a method of accessing files in a remote storage server according to an example embodiment of the present invention.

DETAILED DESCRIPTION OF EXAMPLE EMBODIMENTS

Although example embodiments of the present invention will be described with reference to a personal cell phone, a person of ordinary skill will recognize the methods of the present invention may apply to other wireless devices, such as a personal digital assistant (PDA), handheld video game consoles, mass multimedia storage devices (e.g., MP3 player), or any device capable of supporting wireless or wireline access to the Internet/Intranet. Throughout the specification, the terms cell phone and mobile station will be interchangeably used.

Example embodiments of the present application may include two (2) components, a client program running on a cell phone and a server running remotely to handle the remote storage. The remote storage may be located and managed by a wireless network or a storage website.

For mobile stations running Windows-based systems, the client program may include a file system filter driver, and for mobile stations running Symbian or Linux-based systems, the client program may include a file system hook. For mobile phones that do not run Windows, Symbian or Linux, but support Java™ 2 Platform, Micro Edition (J2ME), a variant is proposed. Regardless of the operating system, the client program captures all the file system calls and depending on the call, performs upload/download of data to/from a remote storage server and allows user applications to behave normally as if the data was retrieved from a local storage. In example embodiments of the present invention, the data management may be automated, therefore, automatic back up of the user's data may be possible. In addition, installing a redundant array of independent disks (RAID) on the remote storage server makes the storage more reliable and resilient to mobile station loss and theft.

Example embodiments of the present invention may include a client program having a kernel component that captures all file system calls and appropriately redirects them (if necessary) to the remote storage server. For example, if a file that the end-user wants to open is not locally cached in an internal memory or media card, then before the file can be opened, the file must be downloaded from the remote storage server. The kernel component for explanation purposes will be referred as a "driver."

Figure 1:
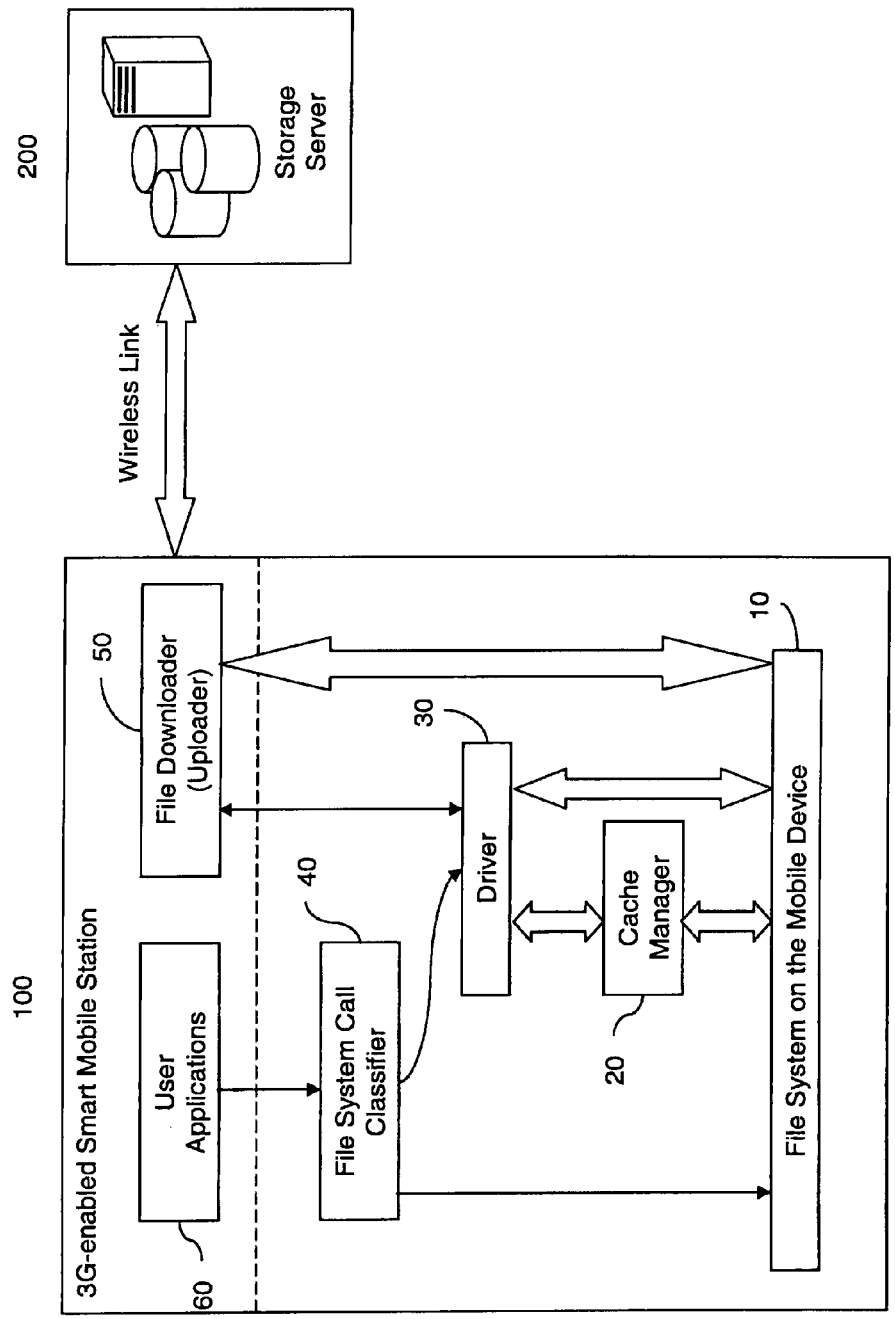
FIG. 1 illustrates a block diagram of a system including a mobile station according an example embodiment of the present invention.

As illustrated in FIG. 1, an example embodiment of the present invention may include a mobile station 100. The mobile station 100 may include user applications 60, a file transfer call classifier (FTCC) 40, a driver 30, a cache manager 20, and a file-system 10.

The driver 30 allows access to a remote storage server 200, the access being completely seamless and transparent to the end-user. When the end-user accesses a file that is already resident in the local storage, the driver 30 will pass all the related file system calls to the file system 10 without any modification. In other words, the files that are "cached" in the local storage may be accessed very quickly.

When the end-user accesses a file that is not present in the local storage, the driver 30 will first determine whether there is sufficient storage space for the file in the local storage. If there is sufficient storage space in the local storage, the driver 30 starts downloading the required file from the remote storage server 200. If there is insufficient space in the local storage, the driver 30 identifies certain files for deletion, deletes them, and then starts downloading the requested file. The activities described above may be performed in a separate prefetching thread, which may start when an "open" is invoked on the desired file. The prefetching allows the "open" call on the file to complete quickly, without waiting for the file to be completely downloaded. Essentially, audio/video playback begins once the initial portion of a clip (file) has been downloaded, and the remaining portions are downloaded concurrently with playback. Thus, the end-user does not perceive considerable latency.

In more detail, when a "read" is requested on a file by the end-user, the driver 30 first waits for the prefetching thread to complete the download of the file or at least complete the download of the relevant portion of the file. The driver 30 then returns the relevant bytes to the user application 60 that invoked the "read" call.

In general, a "write" call operation is easier to handle than a "read" call operation because the driver 30 does not have to wait for the download to complete. The driver 30 just records the offset and number of bytes involved in the write operation.

In addition to these operations disclosed above, the driver 30 may also routinely upload modified files to the remote storage server 200. Uploads may be performed in the background at a lower priority to minimize the impact on end-user perceived performance. In addition, uploading may be postponed if the battery level is low to conserve the battery life for normal cell phone usage. Similarly, if the connection speed is low due to poor link quality, then the upload may be postponed for a later time, or carried out at a slower rate. Further, depending on the signal quality and battery level, the driver may utilize compression for uploads. For example, if the battery level is high and/or the signal quality is low, then compression may be used; on the other hand, if the battery level is low and/or the signal quality is high, then compression may not be used.

In addition, in example embodiments of the present invention, to increase the download rate, multimedia content may be stored in multi-resolution formats that allow streaming of lower resolution media. For example, since a viewable area on a cell phone may be considerably smaller than traditional monitors, lower resolution media may be sufficient. Similarly, depending on the bandwidth of the wireless connection, it may be more efficient to download a compact low-resolution version of a file as opposed to one that is bulky with higher resolution. The methods above allow content to be delivered faster to the cell phone, and hence results in improved performance.

Also, in example embodiments of the present invention, wireless connection quality may be used to determine an appropriate data transfer rate. For example, in dual-mode cell phones, high data transfer rates may be used when the end-user is connected to an 802.11 access point, or lower rates when the cell phone is wirelessly connected. Similarly, compression may be used to reduce data size when bandwidth is limited and battery power is not a major constraint. In order to improve data communication performance in a wireless setting, we intend to use an alternative transport protocol to TCP.

To reduce the amount of data transmitted over a wireless link, example embodiments of the present invention may support direct data transfers between a data source (e.g., website) and the remote storage server. For example, downloading an "mp3" file directly from a music website to the remote storage. This will allow an end-user to directly transfer large files from a web page to the remote storage server 200 without downloading it to the cell phone. This also allows the end-user to download a file for accessing at a later point in time, because it is more efficient to transfer a large file over the (high-bandwidth) wireline network to the remote storage server 200 than downloading the large file to the cell phone directly over a low-bandwidth wireless connection. Similar optimizations may be used to improve the efficiency of email transmissions with large attachments—attaching (transmitting) large files to email messages at the server is a lot more efficient than appending them to email messages sent to a cell phone.

The interactions between a file downloader/uploader component 50 (more below) and the remote storage server 200 occur in the form of "commands," which the client sends to the remote storage server 200 and the remote storage server 200 responds appropriately to these commands. For explanation purposes, "client" may mean a mobile station 100 or components within the mobile station 100. Essentially, each packet from the client to the remote storage server 200 contains certain commands requesting information, and the remote storage server 200 responds with the required information. For explanation purposes only, three different types of commands are described below.

In general, every command may use the following syntax.
<command-name> arg1,arg2, . . . .

When downloading a directory listing from the remote storage server 200, the download of the directory listing occurs when the end-user navigates through a directory tree of the remote storage server 200. The command may have the following syntax.

FD: <full-path name of the remote directory>

The download of the directory listing may occur in conjunction with a cache synchronization mechanism, which is described in more detailed below. The remote storage server 200 upon reception of the command creates a packet containing a complete file listing of the directory. The packet may contain information for each sub-directory and files in that directory. For each sub-directory and files, in addition to named information, additional information, for example, file sizes, modified date, time information, etc. may be added. As discussed below, the additional information may be required to maintain cache consistency. Cache consistency may be necessary if the files on the remote storage server 200 are accessed by multiple devices, and one of the devices makes a change to a file or a directory.

To maintain cache consistency and to maintain file listing synchronized with the remote storage server 200, extra information may be piggybacked with the above commands. Each directory listing may be cached in the local storage with the additional information, for example, the last modification time for that directory. Whenever the file downloader/uploader component 50 receives a request to view a particular directory, it first checks whether a dirinfo file for that directory is locally available. If the dirinfo is present in the local directory, then a copy of the locally present file is checked for consistency against a version available at the remote storage server 200. This may be achieved by adding the last modification time to the above FD command. Therefore, the full syntax of the command may be.

FD: <full-path name of the remote directory> <modification-time>

However, if the dirinfo is not present in the local directory, then the modification-time is set to 0.

When the remote storage server 200 receives the command, it compares the modification time sent in the packet with the actual modification time of the directory. It then creates an appropriate response packet and sends it back to the file downloader/uploader component 50. For example, if the client's last modification time is earlier than the last modification time of that directory on the remote storage server 200, then the remote storage server 200 responds with a packet containing complete directory information. This will allow all "old" data to be expunged from the client's cache and replaced by the latest information. Finally, depending on the information sent by the remote storage server 200, the client may load the directory listing from the cache or the packet sent by the remote storage server 200. It should be noted that the last modification time on the client side may be later than the last modification time on the remote storage server 200, because of a delay in file uploading.

When downloading files from the remote storage server 200, the file download command may have the following syntax.

FF: <full pathname to the file>

The remote storage server 200 responds with a series of packets containing the file contents. The packet size may be configurable and may also be dynamically changed depending on the wireless condition.

When uploading files to the remote storage server 200, the mechanism of file upload may have the following syntax.

UF: <full pathname to the file>

The client may follow the same procedure as the remote storage server 200 for uploading the file contents. In this case, the remote storage server 200 may wait until the file is completely uploaded.

In order to achieve seamless access to the remote storage server 200, it is imperative that the access times and the reliability of the remote files match those of any local file. This may be achieved through effective caching and buffering algorithms.

Next, three (3) different caching mechanisms will be described, but a person of ordinary skill will appreciate that other caching mechanisms may be used.

A reactive cache-update: A storage capacity of a storage device (e.g., media card) on a mobile station is limited, only a few megabytes (MBs) may be available for cache utilization. Thus, whenever more storage space in the local storage is required, it is essential to intelligently select files to be locally cached (stored) to attain a high cache hit ratio. The following are a few commonly used cache schemes. It should be noted that the schemes listed below may be used to delete files or store files in the local cache. The deleting or storing of files depends on the scheme used.

1. Least Recently Used: This scheme is used to delete a file when a file has not been used (opened) for a long period of time and is unlikely to be used in the future.
2. Least Frequently Used: This scheme is used to achieve good results when the probability that an end-user would view a file again is proportional to a frequency of previous visits. In the file attributes, an additional attribute may be added that corresponds to the number of times it has been accessed; this count is incremented every time a file is accessed, and is zeroed out whenever the file is not accessed for a sufficiently long period of time. If the cache is full, then the entry with minimum count is removed and the new entry is inserted.
3. Popular Counts: The end-user might wish to grade files based on what he thinks should be kept in cache for as long as possible. The end-user might want to keep certain files such as important personal or company documents, emails and some audio/video files always locally available. However, these may get moved to the remote storage if there is insufficient space for newly downloaded files.

Proactive cache update or pre fetching: If an end-user is listening to music, proactive cache update intuitively selects the next song for downloading. The criteria for downloading the "next" song may be based on popularity, classification (genre) of the song, or other criteria selected by the end-user.

Caching for minimizing access times: When a file is being removed from the cache, locally storing initial kilobytes (KB) of data may vastly improve the response time of accessing the next file. For example, when moving a frequently viewed video to the remote storage server 200, the initial few seconds of the video may be locally cached so that the next time the video is downloaded, the end-user does not have to wait a long time to start viewing the video. The video may start to play as soon as it is opened.

An example embodiment of the present invention will now be described in detail with reference to FIG. 1. For example purposes only, the description will be made to a mobile station running Windows CE.

A mobile station 100 may include a file transfer call classifier (FTCC) 40. The FTCC 40 may sit above the driver 30. The FTCC 40 checks which file system calls should be handled by the driver 30. File system calls that are not to be handled by the driver 30 are passed directly on to an underlying file-system 10; the rest of the calls are passed on to the driver 30.

In general, the implementation of the example embodiment of the present invention may be applied to a specific directory, for example, a storage directory. The FSCC 40 passes all the file system calls (for example: create, read, write, etc.) for all legitimate end-user files to the driver 30. There may be other files in the storage directory that are not created by an end-user, but are required. The driver 30 ensures that these files are not visible to user applications and blocks all the file-system calls for these files.

A file downloader/uploader (FDU) 50 interacts with the driver 30 and the remote storage server 200. The FDU 50 is responsible for retrieving entire files or relevant portions of files from the remote storage server 200 based on a request from the driver 30. Furthermore, the FDU 50 also uploads files from the mobile station 100 to the remote storage server 200 based a request from a cache manager 20.

The cache manager 20 decides how much and which files are to be locally stored in the mobile station 100. Optionally, there may be a statistic collector in the cache manager 20 that tracks the end-user access patterns to decide which files are to be locally cached.

The file-system calls for a directory (storage directory) are routed through the driver 30 prior to reaching the file system 10. When a file-system call is received, the driver 30 first interacts with the cache-manager 20 to determine whether the file is locally present in the mobile station 100. If the file is locally present, then the file-system call is passed to the file-system 10. On the other hand, if the file is not locally present, then the driver's 30 actions may depend on the filesystem call. For example, if there is a read call for a file that is not locally present, the driver 30 sends a request to the FDU 50 to download the required file.

When an end-user tries to access a file that is not present in the local storage, the driver 30 first determines whether there is sufficient space for the file in the local storage. If there is sufficient space, the downloading of the file is started from the remote storage server 200. Otherwise, the driver 30 identifies certain files for deletion, deletes them, and then starts the downloading process. These activities may be performed in a separate pre-fetching thread, which is started when an "open" is invoked on the file. This allows the "open" call on the file to complete quickly, without waiting for the file to be completely downloaded prior to "playing." The "read", "write", and the other file-system calls may be handled in a similar manner.

When a "read" is invoked on a file, the driver 30 first waits for the pre-fetching thread to complete the download of the file or at least complete the download of the relevant portion of the file. The driver 30 then returns the relevant bytes to the user application 60 that invoked the "read" call.

A "write" call is easier to handle than a "read" call because the driver does not need to wait for the download to complete. It just needs to record the offset and the number of bytes involved in the write operation.

On receiving a file listing call for a directory request, the driver 30 first checks the local availability of a special file called, for example, a dirinfo file corresponding to that particular directory. If the dirinfo file for that directory is not locally available, then it is downloaded from a remote folder of the remote storage sever 200 (to obtain better performance, the download of the appropriate dirinfo file may be started when a user application 60 tries to open a handle to the corresponding directory). The dirinfo file contains the metadata information of the files in that directory, including file names and various file attributes. The driver 30 simply opens the appropriate dirinfo file and returns the file listing of the requested directory.

When a user application 60 attempts to obtain (or set) the attributes of a file including the file size, the driver 30 opens the parent directory's dirinfo file and returns (or changes) the appropriate values.

The other file system calls are either handled in a similar manner or are directly passed on to the file system 10.

In addition to the above operations, the driver 30 also regularly uploads modified files to the remote storage server 200. Uploads are performed in the background at a lower priority to minimize the impact on end-user perceived performance (unless the file is being deleted, in which case the upload thread is temporarily assigned a higher priority). In addition, uploading can be postponed if the battery level is low to conserve the battery for regular phone usage. Similarly, if the connection speed is low due to poor link quality, then the upload can be deferred to a later time, or carried out at a slower rate. Further, depending on the signal quality and battery level, compression for uploads may be utilized. In particular, if the battery level is high and signal quality is low, then compression is used; on the other hand, if the battery level and signal quality are both high, then compression is not used. The client software on the mobile station 100 is responsible for collecting statistics on signal quality, connection speed, application response times, etc.—this is done by making the appropriate operating system calls. (More detailed information can be achieved by snooping on IP packets sent/received by the handset.)

In another example embodiment of the present invention, mobile stations supporting Java or Binary Runtime Environment for Wireless (BREW) may be used. For these systems, a J2ME or BREW application may be used to allow the end-user to access the remote storage server 200. Although this application does not provide transparency, caching algorithms and other enhancements may be used to improve the performance of storing files in a remote storage.

Figure 2:
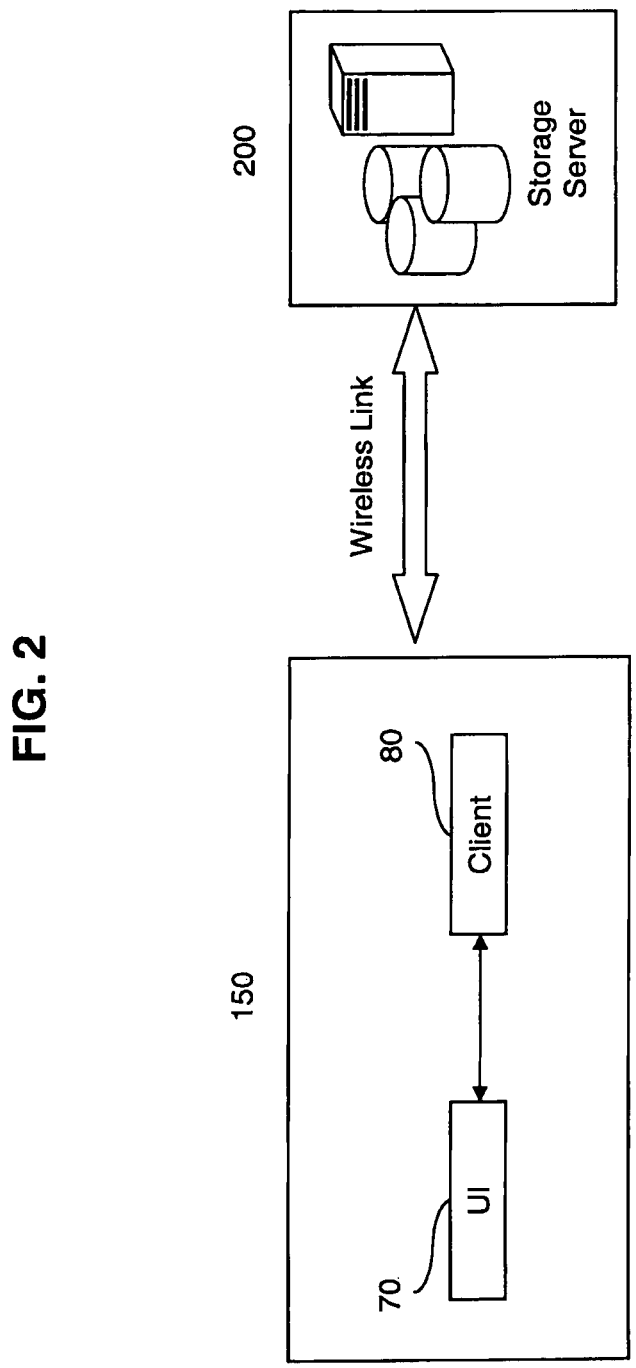
FIG. 2 illustrates a block diagram of a system including a mobile station according to another example embodiment of the present invention.

In the example embodiment of the present invention as illustrated in FIG. 2, a user interface (UI) component 70 and a client 80 for downloading and uploading files (as well as file metadata information) are provided in a mobile station 150.

The UI component 70 allows a listing of a root directory on a remote storage server 200 (e.g., a screen on the mobile station 150 shows a scrollable list of text items containing names of files and sub-directories in the root directory). An end-user may use standard arrow keys to navigate the directory. The directory listing may include a link to the parent directory. The end-user may elect one of the items (file or sub-directory) listed using the select key on the mobile station 150.

For example, selecting a sub-directory allows the end-user to navigate inside that directory. The UI component 70 allows for the display of the file and sub-directory listing for that selected directory. As in the Windows CE implementation, the listing may be contained in a dirinfo file, which may be downloaded from the remote storage server 200 (if not locally cached).

Selecting a file results in the file being opened using the appropriate application, the UI component 70 interacts with the client 80 to determine if the file is locally cached or the file requires downloading. In addition, it uses a file mime type (e.g., audio/mpeg) to determine the application that is registered for handling such files. Both BREW and J2ME provide application program interfaces (APIs) component that allow this information to be obtained dynamically. The UI component 70 invokes the specific application and passes the relevant file name to it.

In addition, several user interface enhancements for easier navigation of the folders and files may be implemented. For example, all sub-directories may be listed before any files are listed. This allows the end-user to navigate though the directory structure more efficiently, because typically, in the remote storage server 200, the number of files is considerably larger than the number of directories. Also, the sub-directories and files may be sorted alphabetically.

A scrolling action may have a built-in acceleration component. When the end-user continuously presses a "down" (or an "up") arrow key, the speed of scrolling may keep increasing until the end-user releases the arrow key. This may allow the end-user to find the desired file more quickly even if the number of files in that directory is very large.

In addition, a prefix matching may be implemented that allows the end-user to type the initial characters of the file names to quickly retrieve the wanted file. When the end-user first types a character, a binary search to determine files that begin with that particular character may be used. In obtaining such a file, the file listing is automatically scrolled up to that point and that particular file may be selected. As the end-user types additional characters, the binary search may begin at that previously selected file to determine the new starting file.

In addition to the above described features, the UI component 70 may also allow the end-user to browse the local directories on the mobile station 150, and select files for uploading to a specific remote directory.

Also in the example embodiment of the present invention, the client component 80 provides a link between the UI component 70 and the remote storage server 200. The client component 80 is similar to the file downloader/uploader component 50 in the Windows CE implementation illustrated in FIG. 1. Essentially, the client component 80 receives a request(s) from the UI component 70 and translates as well as forwards the request to the remote storage server 200. If a file or a dirinfo file requires downloading, the client component 80 downloads the file to a local cache, and then sends a message back to the UI component 70 indicating the completion of the download.

The client component 80 and remote storage server 200 interaction, downloading/uploading files, performance enhancements, etc. may be similarly implemented as described above with respect to FIG. 1 and the detail description of the example embodiments, therefore, additional descriptions thereof are omitted.

With reference to FIG. 3, a method of retrieving a file according to an example embodiment of the present invention will be disclosed. Although the method of retrieving a file according to an example embodiment of the present invention will be described using the mobile station disclosed with regard to FIG. 2, the example embodiment may use the mobile station disclosed with regard to FIG. 3.

In step S100, the driver 30 determines whether a requested file is locally stored or stored in a remote storage server 200. If the requested file is locally cached (locally stored), the driver 30 passes the related file system calls to the file system 10 for quick access in step S110. If the requested file is not locally cached, the driver 30 determines whether there is sufficient space in the local storage to download the requested file from the remote storage server 200 in step S120. A file transfer call classifier (FTCC) 40 may interact with the remote storage server 200 to download the requested file. If there is insufficient space in the local storage, the driver 30 may delete file(s) in step S135 based on a cache scheme as discussed above. Once sufficient space is available in the local storage, a prefetch operation may be started and a portion of the requested file may be downloaded to the local storage in step S145. Once the prefetch portion of the requested file is downloaded, the requested file may be played and concurrently a remaining portion of the requested file may be downloaded in step S155.

Returning to step S120, if there is sufficient space in the local storage to download the requested file, then in step S130, a prefetch operation may be started and a portion of the requested file may be downloaded to the local storage in step S130. Once the prefetch portion of the requested file is downloaded, the requested file may be played and concurrently a remaining portion of the requested file may downloaded in step S140.

The invention being thus described, it will be obvious that the same may be varied in many ways. For example, while an example implementation of the present invention has been described with respect to a mobile station, it will be appreciated that the present invention is applicable to other wireless telecommunication capable devices. Such variations are not to be regarded as a departure from the invention, and all such modifications are intended to be included within the scope of the invention.

What is claimed is:

1. A method of retrieving a file, comprising:
    synchronizing a local storage with a remote storage server by,
        determining a last modification time of a directory based on whether directory information associated with the directory is stored in the local storage,
        sending a command to the remote storage server to check the directory for consistency against a version of the directory stored in the remote storage server, the command including the last modification time, and
        receiving a response packet from the remote storage server, contents of the response packet being based on the sent last modification time;
    determining whether the file is locally stored or remotely stored;
    deleting files in the local storage to provide space if the file is determined to reside in the remote storage server and insufficient space exists in the local storage for the file;
    downloading the file from the remote storage server by prefetching a portion of the file from the remote storage server; and
    opening the prefetched portion of the file while concurrently downloading a remaining portion of the file from the remote storage server.

2. The method of claim 1, further comprising:
    retrieving the file from the local storage if the file is locally stored.

3. The method of claim 1, wherein the portion of the file is prefetched from the remote storage server without deleting files in the local storage if there is sufficient space in the local storage for the file.

4. The method of claim 1, wherein deleting the files in the local storage is based on at least one of a reactive cache-update scheme, a proactive cache update, a pre-fetching scheme, and a minimize access time caching scheme.

5. The method of claim 1, wherein downloading of the file from the remote storage sever is conducted wirelessly.

6. The method of claim 1, wherein the opening of the prefetched portion of the file is performed after a complete download of a relevant portion of the file.

7. The method of claim 1, further comprising:
    transferring data from a data source to the remote storage server.

8. A mobile station adapted to access files in a remote storage server, comprising:
    a file downloader/uploader (FDU), implemented by a processor, configured to communicate with the remote storage server to synchronize a local storage with the remote storage server by,
        determining a last modification time of a directory based on whether directory information associated with the directory is stored in the local storage,
        sending a command to the remote storage server to check the directory for consistency against a version of the directory stored in the remote storage server, the command including the last modification time, and
        receiving a response packet from the remote storage server, contents of the response packet being based on the sent last modification time; and
    a driver, implemented by the processor, configured to determine whether a file is locally stored or remotely stored, to delete files in the local storage to provide space if the file is remotely stored and insufficient space exists in the local storage for the file, and the driver further configured to prefetch a portion of the file from the remote storage server, and to open the prefetch portion of the file while concurrently downloading a remaining portion of the file from the remote storage server via the FDU.

9. The mobile station of claim 8, further comprising:
    a cache manager configured to cache files in the local storage based on a caching scheme.

10. The mobile station of claim 9, wherein the cache manager further comprises:
a statistic collector configured to collect access patterns to determined which of the files are to be cached in the local storage.

11. The mobile station of claim 10, wherein the statistic collector uses at least one of a reactive cache-update scheme, a proactive cache update, a pre-fetching scheme, a minimize access time caching scheme.

12. The mobile station of claim 8, further comprising:
a cache manager configured to delete files in the local storage based on a caching scheme.

13. The mobile station of claim 8, further comprising:
a file transfer call classifier (FTCC) configured to determine which file system calls are to be handled by the driver.

14. The mobile station of claim 8, further comprising:
a plurality of user applications, each of the plurality of user applications configured to invoke an operation on the file.

15. The mobile station of claim 8, where the mobile station is configured to support Java or Binary Runtime Environment for Wireless (BREW).

16. The mobile station of claim 15, further comprising:
a plurality of application program interfaces (APIs), each of the plurality of APIs configured to invoke an operation on the file.

17. The mobile station of claim 15, wherein the driver is a user interface (UI) component.

18. The mobile station of claim 17, wherein the UI component is configured to access a root directory on the remote storage server.

19. The mobile station of claim 8, wherein the driver is configured to completely download a relevant portion of the file prior to the opening of the prefetched portion of the file.

20. The mobile station of claim 8, wherein the FDU is configured to send a command to the remote storage server that instructs the remote storage server to directly download data from a data source.

\* \* \* \* \*